Patented May 14, 1929.

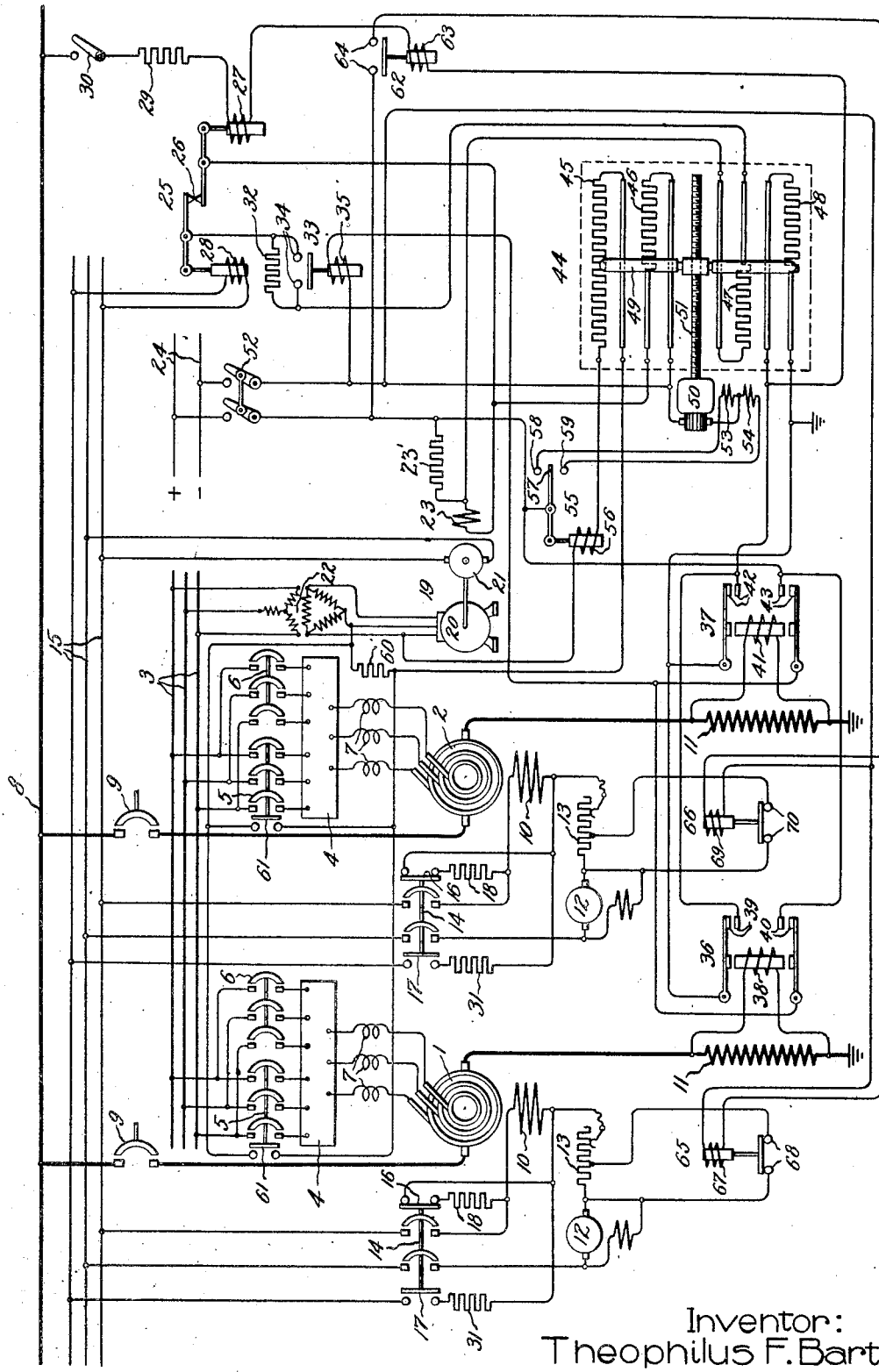

1,713,161

UNITED STATES PATENT OFFICE.

THEOPHILUS F. BARTON, OF SCHENECTADY, NEW YORK, ASSIGNOR TO GENERAL ELECTRIC COMPANY, A CORPORATION OF NEW YORK.

REGULATING SYSTEM FOR DYNAMO-ELECTRIC MACHINES.

Application filed June 7, 1926. Serial No. 114,083.

My invention relates to regulating systems for dynamo-electric machines and more particularly to voltage regulating systems for synchronous converters.

In systems of distribution utilizing synchronous converters for interconnecting an alternating current supply circuit and a direct current distribution circuit, it is usually necessary to provide means to regulate the output voltage of the converters to meet the requirements of the distribution circuit. With reactance in the supply circuit to the converters, such as is furnished by the transformers or separate reactance coils, the voltage at the collector rings may be varied in a well known manner over a limited range by changing the phase of the supply current. As is well known, a change in the main field excitation of the converter will change the phase of the supply current. Thus, for over-excitation, the current to the converter is leading and will increase the line terminal voltage due to the increasing effect of the reactance voltage, while for under-excitation the current to the converter is lagging and will decrease the line terminal voltage due to the decreasing effect of the reactance voltage.

With this type of voltage regulation, overload conditions are determined not only by the load current but also by the reactive current delivered or consumed by the converter. It is also to be noted that the degree of overexcitation or under-excitation varies with variations in the applied alternating voltage irrespectively of a change in the impressed field voltage. In accordance with my invention I adjust the excitation limits for different conditions of applied voltage and load current so that overloading or prohibitive heating will not be obtained either by the reactive current or load current, or by a combination of the two.

An object of my invention is to provide an improved regulating system for dynamo-electric machines by which the maximum and minimum limits of field excitation may be automatically adjusted to insure safe operating conditions with variations in the electrical input and output characteristics of said machines.

As my invention is particularly applicable to electrical systems in which synchronous converters are used to supply a direct current load circuit, it will be described with reference to such systems. A specific embodiment of the invention comprises one or more synchronous converters of the field control type having direct current exciters for field excitation, the variation in field excitation being obtained by using counter-electromotive force regulating equipment which operates to vary the voltage applied to the fields of the converter. In order to afford protection to the converters when the load and alternating voltage change, the adjustment of a rheostat, which is used in connection with a voltage regulator for controlling the voltage of the counter-electromotive force regulator, is automatically varied so as to adjust the maximum and minimum limits of field excitation under any operating condition of load and applied voltage.

My invention will be better understood from the following description taken in connection with the accompanying drawing which shows diagrammatically one embodiment of the invention, and its scope will be pointed out in the appended claims.

In the drawing, each of a plurality of synchronous converters, which have been designated 1 and 2, are arranged to be connected to the alternating current supply circuit 3 through suitable transformers 4 and switching means 5 and 6. When switches 5 are closed, the ratio of transformation between the supply circuit and converter slip rings is arranged to be higher than when switches 6 are closed by changing from a full winding to a tapped winding on transformer 4. This arrangement permits two running connections so that the direct current voltage range is greater than would be obtainable by field control alone.

In order that variations in the excitation of the converter may change the direct current voltage, reactors 7 are connected in the supply circuit to each converter. As is well understood in the art, under certain conditions, there may be sufficient reactance in the transformers or supply circuit to the converters so that the desired voltage regulation may be obtained without using the separate reactors.

The direct current circuit 8 is shown as one side of a distribution system, while the other side is shown as a ground return. Each converter is arranged to be connected to the circuit 8 by any suitable switching means, such as a circuit breaker 9. The other side of the converters are connected to ground.

Each converter is provided with a main field winding 10 and a series commutating field winding 11. An exciter 12 associated with each converter is provided for supplying a substantially constant voltage for the excitation of field windings 10. Each exciter is provided with a suitable adjustable series resistance 13, in order to provide a means to make any desired initial adjustment of the excitation from this source. These exciters may be driven by any suitable means (not shown) and if convenient each exciter may be directly connected to the converter with which it is associated. Suitable switching means, such as circuit breaker 14, is provided for each exciter in order to connect the exciter to the control bus 15. This circuit breaker may be of the usual two-pole type and is provided with auxiliary contacts 16 and 17. Contact 16 is arranged to engage its cooperating contacts in the circuit of a field discharge resistor 18 for field winding 10, when circuit breaker 14 moves to its circuit interrupting position, while contact 17 is arranged to close its cooperating contacts when circuit breaker 14 is moved to its circuit closing position in order to provide a connection across each converter field winding.

A counter-electromotive force regulator 19 is arranged to be used with the converter exciters, and, as shown, one regulator set is arranged to serve for all the converters of a given group. This regulator comprises a motor 20 driving a direct current generator 21 which is arranged to have its voltage in opposition to the voltage of the exciters 12. The motor as shown is an alternating current motor, such as a three-phase, squirrel-cage induction motor. A suitable transformer 22 is interposed between the motor and the supply circuit 3. It will of course be apparent that any convenient source of current or any other suitable type of motor may be used. The generator 21 is provided with a field winding 23 which is separately excited from a suitable source of direct current, such as the direct current bus 24. In order to permit the use of one regulating set for any number of exciters that may be in service, connections are made to the control bus 15 so that each converter field is supplied from its individual exciter through the counter-electromotive force regulating equipment.

The voltage of the counter-electromotive regulating set is controlled by a regulator 25, such as a vibratory regulator of the Tirrill type and, as shown, comprises co-operating contacts 26 which are arranged to short circuit periodically the field winding 23 of the regulating generator. A resistor 23' is connected in series with the field winding 23 to limit the voltage applied to the generator field, and to limit the amount of current in the circuit from the bus 24 when the field is short circuited by the contacts of the regulator.

The cooperating contacts 26 of the regulator are arranged to be operated by control magnets 27 and 28. As shown, the control magnet 27 is connected to be responsive to the distribution circuit voltage. One terminal of the winding is arranged to be connected to the circuit 8 through a suitable resistance 29, and a switch 30. The other terminal thereof is connected to ground. The control magnet 28 corresponds to the anti-hunting winding of the usual type of vibratory regulator and is connected across the outside conductors of bus 15 and, therefore, is connected across the field circuits of the converters. In order to avoid transfer switches in case certain converters are not being operated, a connection is made through a suitable resistance 31 to each field circuit and this connection is closed through the auxiliary contact 17 of the particular field circuit breaker which has been moved to the circuit closing position. This insures excitation of the control magnet 28 from the converters that are operating, and prevents the field windings of the machines that are not in operation from influencing the regulation.

The auxiliary equipment operating in conjunction with regulator 25 will now be considered in some detail.

A resistor 32 is arranged to be short circuited by a relay 33. This resistor 32 is in series with the regulator contacts 26 which short circuit the field 23 of the regulator generator 21. The relay 33 comprises contacts 34 and an operating coil 35, the excitation of which is controlled by electro-responsive devices 36 and 37, referred to hereinafter as contact making ammeters, associated with converters 1 and 2 respectively. The contact making ammeter 36 comprises an operating coil 38 and cooperating contacts 39 and 40. It is desired to energize coil 38 in response to the load current of the converter and a convenient connection is shown whereby this coil is energized in accordance with the voltage drop across the commutating field 11 of converter 1. Similarly, contact making ammeter 37 comprises an operating coil 41 and contacts 42 and 43; the operating coil 41 being connected across the commutating field 11 of converter 2. It will be observed that the corresponding contacts of the contact making ammeters are connected in parallel and hence the engagement of contacts 39 or 42, or the engagement of contacts 40 or 43, will perform the same function when operated.

These contact making ammeters are adjusted to close contacts 39 and 42 below a predetermined current and to close contacts 40 and 43 above a predetermined current. When contacts 40 or 43 are closed, relay 33 is actuated to close its contacts 34 and thereby short circuit the resistor 32 in series with the field winding of generator 21.

The principal factors which must be considered in connection with the control of the direct-current voltage by change of converter field excitation are the applied alternating voltage, the direct current output, and the shunt field excitation. If a minimum and maximum excitation limit is fixed for a predetermined alternating voltage, and an alternating voltage above the predetermined value occurs, the lower limit of excitation must be increased so as not to increase the limit of lagging reactive current, whereas, with an alternating voltage below the predetermined value, the maximum excitation must be decreased in order not to exceed the limit of leading reactive current. For a given load, therefore, it is necessary to change the limits of excitation of the converter with variations in alternating voltage in order to keep the reactive current within predetermined limits.

For the control of these limits, a four element motor operated rheostat 44 with suitable auxiliaries is provided. This rheostat comprises four resistor units 45, 46, 47 and 48. Cooperating with these resistor units is a contact 49 which is capable of being moved by means of a reversible motor 50 operating through a suitable means, shown as a threaded shaft 51. The motor 50 may be energized from any desirable source and, as shown, is arranged to be connected to the direct current bus 24 through a suitable switch 52. The motor is provided with two field windings 53 and 54 which are arranged so that the energization of one field or the other will produce rotation in the forward or reverse direction. As shown, when field winding 53 is energized, motor 50 will be rotated in a direction to move contact 49 to the right, and when field winding 54 is energized, motor 50 will move contact 49 to the left.

An electro-responsive device 55 is arranged to control the direction of rotation of motor 50 and consequently the movement and position of contact 49. Electro-responsive device 55 is provided with an operating coil 56 which is connected to be responsive to the alternating voltage of conductors 3, and is arranged to actuate a movable contact member 57 which cooperates with stationary contacts 58 and 59 to complete an energizing circuit for field winding 53 or 54, respectively.

The resistor 45 of rheostat 44 is connected in series relation with coil 56 of device 55 and is used to fix the mechanical position of the rheostat arm 49, depending upon the magnitude of the alternating supply voltage. Resistor 46 is connected in series with the field winding 23 of the regulating generator in a circuit to the supply bus 24 so that for an increase in alternating voltage, the voltage applied to the field of the counter-electromotive force regulating generator is reduced. Resistor 47 is connected in series with resistor 32 across the regulator contacts 26, so that when a portion of resistor 47 is introduced the regulating contacts make a less complete short circuit of the field winding 23 of the regulating generator. Resistor 48 is in series with the voltage coil 27 of regulator 25 and is in circuit depending upon the engagement or disengagement of contacts 39 or 42 of the contact making ammeters 36 and 37. Since these contacts are arranged to close below a predetermined load which is a fraction of normal load, resistor 48 serves to recalibrate the regulator 25 under light load conditions.

When changing the ratio of voltage transformation between the supply circuit 3 and the converter collector rings from a higher to a lower value, it is desirable to reduce the voltage applied to the operating coil of device 55. For this purpose, a resistance 60 is introduced in series with the operating coil 56 of device 55 when switches 5 are moved to the circuit opening position. Each switch 5 associated with converters 1 and 2 respectively is provided with an auxiliary contact 61 which is arranged to short circuit resistance 60 when the converters are operated with the higher voltage ratio, that is, when switches 5 are moved to the circuit closing position and switches 6 are moved to the circuit opening position.

A relay 62 is connected in a series circuit with voltage regulating coil 27 and is arranged to be responsive to the voltage of the distribution circuit 8. This relay comprises an operating coil 63 and contacts 64 which are arranged to be closed when the voltage of circuit 8 exceeds a predetermined value. The closure of contacts 64 completes a circuit from the bus 24 to energize relays 65 and 66. The relay 65 comprises an operating coil 67 and contacts 68 and is arranged to introduce a normally short circuited portion of resistance 13 in the circuit of exciter 12 which is associated with converter 1. Similarly, the relay 66 comprises an operating coil 69 and contacts 70 and is arranged to introduce a normally short circuited portion of resistance 13 in the circuit of exciter 12, which is associated with converter 2.

The operation of the arrangement shown is as follows: Assume the converters are operating with switches 5 closed and switches 6 open. Switches 9 are assumed to be closed so that each converter is capable of feeding energy into the direct current distribution circuit 8. When switches 5 are closed and switches 6 are open, contacts 61 short circuit the resistance 60. The exciters 12 are assumed to be operating with circuit breakers 14 in the circuit closing position. Assume also that switches 30 and 52 have been closed and that motor 20° of the counter-electromotive force regulating set is energized and driving generator 21 so as to produce a desired regulating voltage in opposition to the voltage of the exciters 12. The other relays and contact making devices are assumed to be in the position shown. The electroresponsive device 55, energized in response to the alternating supply voltage, is adjusted so that for normal alternating voltage the motor operated rheostat 44 will assume the position shown, which may be referred to as the neutral position.

The regulator 25 operates to short circuit periodically the field winding 23 of the regulating generator 21. The coil 28 of this regulator being excited across the converter field windings will have a rapid vibratory action and will tend to hold a constant voltage for a given excitation of the voltage regulating coil 27. With an increase in direct current voltage, the voltage regulating coil 27 will tend to increase the interval between the periods of short circuit so that the average effect is to produce an increase in the voltage of the regulating generator and thereby a decrease in converter field excitation. With a decreased converter excitation, the lagging reactive current will increase and thereby tend to decrease the alternating voltage applied to the converter terminals, which in turn decreases the direct current output voltage. With a decrease in the distribution circuit voltage, the interval between the periods of short circuit will be decreased so that the average excitation of the regulating generator is decreased. This results in an increase in converter excitation, which in turn decreases the lagging reactive current and thereby tends to increase the distribution circuit voltage.

With an increase in alternating voltage, the electro-responsive device 55 is actuated so that contact 57 will engage contact 58. A circuit is now completed from the positive side of the control bus 24, through switch 52, contacts 57 and 58, field winding 53, the armature of motor 50, switch 52, to the negative side of the control bus 24. Motor 50 rotates in a direction to move contact 49 to the right. This increases the resistance 45 in series with coil 56 and reestablishes a balanced condition for electro-responsive device 55. This movement of contact 49 also inserts the resistance 46 in series with the field winding 23 of the regulating generator 21. When the rheostat arm 49 is in the neutral position, there is no part of resistor 46 included in the field winding circuit, but with each successive position to the right more and more resistance is included. By increasing the resistance of this circuit, the maximum voltage of generator 21 is gradually reduced, and, therefore, the minimum voltage applied to the converter fields is gradually increased. This increase in converter field excitation voltage, therefore, compensates for the increase in alternating voltage.

Now assume that with contact 57 of device 55 in the neutral position the alternating voltage decreases. This results in contact 57 moving to engage contact 59. A circuit is completed from the positive side of the control bus 24, through switch 52, contacts 57 and 59, field winding 54, the armature of the motor 50, switch 52, to the negative side control bus 24. The motor 50 now rotates in a direction to move contact 49 to the left. This decreases the resistance 45 and 46 and, when the contact 49 passes to the left beyond the neutral position, resistance 47, in series with the contacts of the regulator 25, will be introduced. With a continued movement of contact 49, the resistance in this circuit increases and the regulator contacts 26 make a less complete short circuit of the field of the regulator generator 21, and, therefore, its minimum voltage is increased, which means that the maximum voltage applied to the converter fields is gradually decreased.

In the position to the right of the so-called neutral position, contact 49 also introduces a portion of the resistance 48 in series with the coil 27 of the regulator 25. With a predetermined limit for the value of the reactive current at no load, it becomes desirable to maintain a minimum excitation, which will not exceed the lagging reactive current limit at loads greater than no load. This resistance, therefore, being in series with the voltage regulating coil 27, will tend to influence the regulator 25 to hold a higher direct current voltage across the converter fields for any load below that for which contacts 39 and 42 are arranged to close. Above a predetermined load, such as 40% of normal, the inherent drop in voltage through the converter is such that this protection may not be necessary for the over voltage conditions of the alternating current supply in a particular system so that the resistance is removed from the circuit by the closing of contacts 39 and 42, which short circuit the portion of resistance 48 introduced when the contact 49 moves to the right.

If it is assumed that the converters are operating above the normal load condition, for example above 150% load on a short-time rating, the contact making ammeters are arranged to close contacts 40 and 43. When these contacts close, relay 33 is energized and the resistor 32 is short circuited. The short circuiting of this resistor results in permitting the regulator contacts 26 to fully short circuit the field winding of the regulating generator 21 and thereby allow full excitation to the fields of the converters from the exciters 12. This condition, therefore, permits an increase in the limit for maximum excitation for overload conditions, except in so far as it is modified by the position of contact 49 on resistance 47.

With a direct current voltage above a predetermined value, relay 62 is arranged to close its contacts 64. This completes a circuit from the positive side of bus 24, through switch 52, contacts 64, coils 67 and 69 of relays 65 and 66, switch 52, to the negative side of the bus 24. Upon the energization of coils 67 and 69, contacts 68 and 70 are opened and thereby a portion of resistance 13 is ininserted in series with each of the exciters 12 associated with converters 1 and 2, respectively. This reduces the maximum excitation of the converters even if the voltage of the regulating generator is reduced to zero.

From the foregoing description and operation of the regulating equipment, it will be observed that there is a definite minimum and maximum excitation for a predetermined alternating supply voltage and that this minimum and maximum limit is automatically varied to compensate for changes in alternating voltage; furthermore, that the minimum excitation limit is increased at current values under a predetermined load, and that the maximum excitation limit is increased at current values above a predetermined load.

While I have shown and described a particular embodiment of my invention, it will be obvious to those skilled in the art that changes and modifications may be made without departing from my invention and I, therefore, aim in the appended claims to cover all such changes and modifications as fall within the true spirit and scope of my invention.

What I claim as new and desire to secure by Letters Patent of the United States, is:

1. In combination, an electric circuit, a dynamo-electric machine connected to said circuit, means for varying the excitation of said dynamo-electric machine, and means connected to said circuit for selectively adjusting the operating limits of said first mentioned means in accordance with the magnitude of the variation of an electrical characteristic of said electric circuit from a predetermined value.

2. In combination, an alternating current circuit, a direct current circuit, a dynamo-electric machine for interconnecting said circuits, means for varying the excitation of said dynamo-electric machine, and means responsive to electrical characteristics of said circuits for varying the operating limits of said first mentioned means.

3. In combination, an alternating current circuit, a direct current circuit, a dynamo-electric machine for interconnecting said circuits, means for varying the excitation of said dynamo-electric machine, and means responsive to electrical characteristics of said circuits for adjusting the minimum excitation limit of said dynamo-electric machine.

4. In combination, an alternating current circuit, a direct current circuit, a dynamo-electric machine for interconnecting said circuits, means for varying the excitation of said dynamo-electric machine, and means responsive to electrical characteristics of said circuits for adjusting the maximum excitation limit of said dynamo-electric machine.

5. In combination, a supply circuit, a distribution circuit, a dynamo-electric machine for interconnecting said circuits, means comprising a regulator responsive to an electrical characteristic of the distribution circuit for controlling the excitation of said dynamo-electric machine, and means responsive to an electrical characteristic of said supply circuit for modifying the action of said regulator.

6. In combination, a supply circuit, a distribution circuit, a dynamo-electric machine for interconnecting said circuits, means responsive to the voltage of the distribution circuit for controlling the excitation of said dynamo-electric machine, and means responsive to the voltage of the supply circuit for varying the operating limits of said excitation controlling means.

7. In combination, an alternating current circuit, a direct current circuit, a synchronous converter for interconnecting said circuits, a field winding for said converter, a source of excitation for said field winding, a source of electromotive force connected in series relation with said source of excitation, means for varying the voltage of said source of electromotive force, and means for varying the voltage limits of said source of electromotive force.

8. In combination, an alteranting current circuit, a direct current circuit, a synchronous converter for interconnecting said circuits, a field winding for said converter, a source of substantially constant voltage for exciting said field winding, a counter-electromotive force generator in series relation with said source, means for varying the voltage of said generator, and means responsive to electrical characteristics of said circuits for varying the voltage limits of said generator.

9. In combination, an alternating current circuit, a direct current circuit, a synchronous converter for interconnecting said circuits, a field winding for said converter, a source of substantially constant voltage for exciting said field winding, a counter-electromotive force generator in series relation with said source, means for varying the voltage of said generator, means responsive to the voltage of said alternating current circuit for varying the voltage limits of said generator, and means responsive to the load current of said converter for modifying said voltage limits.

10. In combination, an alternating current circuit, a direct current circuit, a synchronous converter for interconnecting said circuits, a field winding for said converter, means for changing the voltage applied to said converter a source of substantially constant voltage for exciting said field winding, a counter-electromotive force generator in series relation with said source, means for varying the voltage of said generator, means responsive to the voltage of said alternating current circuit for varying the voltage limits of said generator, means responsive to the voltage applied to said converter for modifying the operation of said alternating current circuit responsive means, and means responsive to the load current of said converter for modifying the limits established by said voltage responsive means.

11. In a system of distribution comprising an alternating current circuit and a direct current circuit, a dynamo-electric machine interconnecting said circuits, means for varying the reactive current interchanged between said machine and said alternating current circuit, and means responsive to an electrical characteristic of said alternating current circuit for varying the operating limits of said first mentioned means.

12. In a system of distribution comprising a supply circuit and a distribution circuit, a synchronous converter for interconnecting said circuits, means for changing the phase of the supply current to said converter, and means responsive to the voltage of said supply circuit for varying the limits of the leading or lagging components of said supply current.

13. In a system of distribution comprising a supply circuit and a distribution circuit, a synchronous converter interconnecting said circuits, means for varying the field excitation of said converter, and means for varying the operating limits of said first mentioned means upon a departure of said supply voltage from a predetermined value.

14. In a system of distribution comprising a supply circuit and a distribution circuit, a synchronous converter for interconnecting said circuits, a field winding for said converter, means having predetermined operating lmits at a predetermined supply voltage for controlling the excitation of said converter, means for increasing the minimum limit of said excitation controlling means when the voltage of said supply circuit is above a predetermined value, and means for decreasing the maximum limit of said excitation controlling means when the voltage of said supply circuit is below a predetermined value.

15. In a system of distribution comprising a supply circuit and a distribution circuit, a synchronous converter for interconnecting said circuits, a field winding for said converter, means having predetermined maximum and minimum voltage limits when said alternating voltage is a predetermined value for controlling the excitation voltage of said converter, means for increasing said minimum voltage limit when the voltage of said supply circuit is above a predetermined value and for decreasing said maximum voltage limit when the voltage of the suppy circuit is below a predetermined value, and means for increasing the maximum voltage limit established by said second mentioned means when the load current of said converter is above a predetermined value.

16. In combination, an alternating current circuit, a direct current circuit, a synchronous converter for interconnecting said circuits, a field winding for said converter, an exciter for said field winding, a counter-electromotive force generator in series relation with said exciter, a regulator for controlling the voltage of said generator, resistors cooperating with said regulator for varying the effect thereof, and an electroresponsive device for adjusting the effective value of said resistors in accordance with the voltage of said alternating current circuit.

17. In combination, an alternating current circuit, a direct current circuit, a synchronous converter for interconnecting said circuits, a field winding for said converter, a counter-electromotive force generator in series relation with said exciter for controlling the field excitation of said converter, a field winding for said generator, a regulator comprising cooperating contacts for periodically short circuiting said generator field winding, a resistor connected in a circuit with said generator field winding and said regulator contacts, and an electroresponsive device for short circuiting said resistor when the load current of said converter is above a predetermined value.

18. In combination, an alternating current circuit, a direct current circuit, a synchronous converter for interconnecting said circuits, a field winding for said converter, an exciter for said field winding, a counter-electromotive force generator in series relation with said exciter for controlling the field excitation of said converter, a field winding for said generator, a regulator comprising cooperating contacts and control magnets for periodically short circuiting said generator field winding, a resistor connected in a circuit with said generator field winding, a second resistor connected in a circuit with one of the control magnets of said regulator, and an electroresponsive device for short circuiting said first mentioned resistor when the load current of the converter is above a predetermined value and for short circuiting said second resistor when the load current of said converter is below a predetermined value.

19. In combination, an alternating current circuit, a direct current circuit, a synchronous converter for interconnecting said circuits, a field winding for said converter, an exciter for said field winding, a counter-electromotive force generator in series relation with said exciter for contr_'ling the field excitation of said converter, a regulator comprising cooperating contacts and control magnets for controlling the voltage of said generator, resistances cooperating with said regulator for varying the voltage limits of said generator, a device responsive to the voltage of said alternating current circuit for varying the effective value of said resistances, a resistor connected in a circuit with said generator field winding, a second resistor connected in a circuit with one of the control magnets of said regulator, and an electroresponsive device for short circuiting said first mentioned resistor when the load current of said converter is above a predetermined value and for short circuiting said second mentioned resistor when the load current of said converter is below a predetermined value.

20. In a system of distribution comprising a supply circuit and a distribution circuit, a plurality of dynamo-electric machines for interconnecting said circuits, a field winding for each of said machines, an exciter for each of said field windings, a counter-electromotive force generator for varying the field excitation of said machines, said counter-electromotive force generator being arranged to serve for all of said exciters and connected so that each machine field is energized through its individual exciter and the counter-electromotive force generator, means responsive to the voltage of said distribution circuit for varying the voltage of said generator, and means responsive to electrical characteristics of said circuits for varying the excitation limits of said dynamo-electric machines.

21. In a system of distribution comprising a supply circuit and a distribution circuit, a plurality of synchronous converters for interconnecting said circuits, a field winding for each converter, an exciter for each field winding, a counter-electromotive force generator for varying the field excitation of said converters, said counter-electromotive force generator being connected in series with all of said exciters across said converter field windings, a vibratory regulator operating to periodically short circuit the field winding of said generator for varying the voltage impressed upon said converter fields, an electroresponsive device responsive to the voltage of said supply circuit for adjusting the maximum and minimum voltage limits of said counter-electromotive force generator, and a second electroresponsive device responsive to the load current of said converters for modifying the maximum and minimum voltage limits established by said supply circuit responsive device.

22. In a system of distribution comprising a supply circuit and a distribution circuit, a plurality of synchronous converters interconnecting said circuits, means for changing the voltage ratio between said supply circuit and the alternating current terminals of said converters, means for varying the field excitation of said converters between maximum and minimum voltage limits when the supply circuit voltage is a predetermined value, means for increasing said minimum voltage limit when the supply circuit voltage is above said predetermined value, means for decreasing said maximum voltage limit when the supply circuit voltage is below said predetermined value, means for increasing said maximum voltage limit established by said voltage responsive means when the load current of said converters is above a predetermined value, and means for increasing the minimum voltage limit established by said voltage responsive means when the load current of said converters is below a predetermined value.

23. In combination an alternating circuit, a direct current circuit, a synchronous converter for interconnecting said circuits, a field winding for said converter, an exciter for said field winding, a counter-electromotive force generator in series relation with said exciter for controlling the field excitation of said converter, a regulator for controlling the voltage of said generator, means cooperating with said regulator for establishing maximum and minimum voltage limits for said generator, means responsive to the voltage of said alternating current circuit for varying said maximum and minimum voltage limits, means controlled by said second mentioned means for controlling the operation of said second mentioned means, means controlled by the load current of said converter for increasing the maximum and minimum voltage limits established by said second mentioned means, and means responsive to the voltage of said direct current circuit for decreasing the voltage of said exciter when the voltage of said direct current circuit is above a predetermined value.

In witness whereof, I have hereunto set my hand this 5th day of June, 1926.

THEOPHILUS F. BARTON.

CERTIFICATE OF CORRECTION.

Patent No. 1,713,161.  Granted May 14, 1929, to

THEOPHILUS F. BARTON.

It is hereby certified that error appears in the printed specification of the above numbered patent requiring correction as follows: Page 5, line 98, claim 8, for the misspelled word "alteranting" read "alternating"; page 6, line 43, claim 14, for the misspelled word "lmits" read "limits", and line 65, claim 15, for "suppy" read "supply"; page 7, line 82, claim 23, before the word "circuit" insert the word "current"; and that the said Letters Patent should be read with these corrections therein that the same may conform to the record of the case in the Patent Office.

Signed and sealed this 2nd day of July, A. D. 1929.

(Seal)

M. J. Moore,
Acting Commissioner of Patents.